(12) United States Patent
Ell

(10) Patent No.: US 11,089,825 B1
(45) Date of Patent: Aug. 17, 2021

(54) STEP TRIGGERED LIGHT UP FOOTWEAR

(71) Applicant: Jacob M. Ell, Dilworth, MN (US)

(72) Inventor: Jacob M. Ell, Dilworth, MN (US)

( * ) Notice: Subject to any disclaimer, the term of this patent is extended or adjusted under 35 U.S.C. 154(b) by 0 days.

(21) Appl. No.: 16/909,535

(22) Filed: Jun. 23, 2020

(51) Int. Cl.
| | | |
|---|---|---|
| *A41D 13/01* | (2006.01) | |
| *F21V 23/00* | (2015.01) | |
| *F21V 21/08* | (2006.01) | |
| *F21S 10/02* | (2006.01) | |
| *H05B 47/16* | (2020.01) | |
| *F21V 23/04* | (2006.01) | |
| *H05B 47/19* | (2020.01) | |
| *A43B 3/00* | (2006.01) | |
| *A41D 11/00* | (2006.01) | |
| *A41D 1/00* | (2018.01) | |
| *A43B 23/24* | (2006.01) | |
| *F21Y 115/10* | (2016.01) | |
| *F21Y 113/10* | (2016.01) | |

(52) U.S. Cl.
CPC .............. *A41D 13/01* (2013.01); *A41D 1/005* (2013.01); *A41D 11/00* (2013.01); *A43B 3/001* (2013.01); *A43B 23/24* (2013.01); *F21S 10/023* (2013.01); *F21V 21/0816* (2013.01); *F21V 23/003* (2013.01); *F21V 23/045* (2013.01); *F21V 23/0471* (2013.01); *H05B 47/16* (2020.01); *H05B 47/19* (2020.01); *A41D 2300/32* (2013.01); *F21Y 2113/10* (2016.08); *F21Y 2115/10* (2016.08)

(58) Field of Classification Search
CPC ........ A41D 13/01; A41D 1/005; A41D 11/00; A41D 2300/32; H05B 47/19; H05B 47/16; A43B 3/001; A43B 23/24; F21S 10/023; F21V 21/0816; F21V 23/003; F21V 23/045; F21V 23/0471; F21V 33/0004; F21V 33/0008; F21Y 2113/10; F21Y 2115/10

See application file for complete search history.

(56) References Cited

U.S. PATENT DOCUMENTS

| | | | |
|---|---|---|---|
| 5,438,488 A | 8/1995 | Dion | |
| 5,473,518 A | 12/1995 | Haber | |
| 5,508,899 A | 4/1996 | McCormick | |
| 5,724,265 A * | 3/1998 | Hutchings | ............ A43B 3/0005 |
| | | | 235/105 |
| 5,894,686 A * | 4/1999 | Parker | .................. A43B 3/0021 |
| | | | 36/137 |
| 6,238,055 B1 | 5/2001 | Wallace | |
| 6,991,342 B2 | 1/2006 | Gonet | |

(Continued)

*Primary Examiner* — Bao Q Truong
(74) *Attorney, Agent, or Firm* — Neustel Law Offices

(57) ABSTRACT

A step triggered light up footwear device that creates a flash of one or more lights when a wearer moves or takes a step. The device includes a body with a battery holder, a battery, a manual switch, and a motion sensor. It includes a first light-emitting element, a second light-emitting element, and a control circuit connected to and powered by the battery. The control circuit is also connected to the first light-emitting element and the second light-emitting element, and may be further connected to receive inputs from the manual switch and the motion sensor, such that operation of the manual switch causes the control circuit to provide power to light the first light-emitting element for a first time period, and such that a motion sensed by the motion sensor causes the control circuit to provide power to light the second light-emitting element for a second time period.

20 Claims, 10 Drawing Sheets

(56) References Cited

U.S. PATENT DOCUMENTS

| | | | |
|---|---|---|---|
| 2007/0041193 A1* | 2/2007 | Wong | A43B 3/0005 |
| | | | 362/276 |
| 2009/0267537 A1 | 10/2009 | Rubinstin | |
| 2009/0272013 A1* | 11/2009 | Beers | A43B 1/0054 |
| | | | 36/137 |
| 2014/0139353 A1 | 5/2014 | Wojcieszak | |
| 2017/0135178 A1 | 5/2017 | Sutton | |
| 2017/0339773 A1* | 11/2017 | Chen | F21V 33/0008 |

* cited by examiner

STEP TRIGGERED LIGHT UP FOOTWEAR

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a Step-Triggered Light Up Footwear device that lights up when a user takes a step.

Related Art

Any discussion of the related art throughout the specification should in no way be considered as an admission that such related art is widely known or forms part of common general knowledge in the field.

Typical light-up footwear is in the form of a shoe, which a child will rapidly outgrow. Further, such footwear also only produces light in the form of a momentary flash—i.e., without also having a sustained light. A longer-lasting product that a child will not rapidly outgrow, and that uses different control of lights and patterns, can be more interesting and may also enhance a child's experience while playing games that use the imagination.

SUMMARY

An example embodiment is directed to a step-triggered light up footwear device. The device is generally a wearable light-up device that includes a body with a battery holder, a manual switch, and a motion sensor. The device may include a battery positioned in the battery holder, a first light-emitting element, a second light-emitting element, and a control circuit connected to and powered by the battery. The control circuit is also connected to the first light-emitting element and the second light-emitting element, and may be further connected to receive inputs from the manual switch and the motion sensor, such that operation of the manual switch causes the control circuit to provide power to light the first light-emitting element for a first time period, and such that a motion sensed by the motion sensor causes the control circuit to provide power to light the second light-emitting element for a second time period.

The motion sensor in some example embodiments may be an impact switch, and further, the second light-emitting element may light up momentarily when a user takes a step. In addition, the manual switch may comprise a pushbutton switch.

In an example embodiment, the first light-emitting element may be or include a first plurality of light-emitting elements mounted on the body. In addition, the second light-emitting element may be a second plurality of light-emitting elements mounted on the body. Further, in some embodiments, the first time period is longer than the second time period, so that activation of the manual switch causes the first plurality of light emitting elements to come on for a relatively sustained time period, while an impact, such as a step or other motion, may cause the second plurality of light-emitting elements to light up for a short time period, giving a flash effect.

In some embodiments of the wearable light-up device the body comprises a first body, and also a second body flexibly connected to the first body. The second body further comprises means to secure the second body to a user's leg, such as Velcro straps or an elastic sleeve. The second body may be rigid or flexible but having a fixed shape, and may be in the form of a shin guard with a fabric, foam, or other backing material on the inside to increase a user's comfort. The second body may be connected to the first body by a connecting element, such as a flexible fabric, and the first light-emitting element may include a first plurality of light-emitting elements mounted on the second body and being electrically connected to the control circuit, and the second light-emitting element may include a second plurality of light-emitting elements mounted on the second body and may be electrically connected to the control circuit.

The light-emitting element or elements of the first plurality of light-emitting elements may be mounted on the first body and the light-emitting element or elements of the second plurality of light-emitting elements may be mounted on the first body. In any of the embodiments described herein, the first body and the second body may be flexible or rigid, and the light emitting elements may be LEDs of any type, such as bi-color, multicolor, RGB, etc. The light emitting elements may also be any other type of device, such as incandescent.

Further embodiments include a method of using any device described above, the method comprising: attaching the wearable light-up device to a user's leg or foot; using the manual switch to activate the first light-emitting element for the first time period; and taking a step so that the motion sensor is activated such that the second light-emitting element is activated for the second time period. The method may be used wherein the first light-emitting element comprises a first plurality of light-emitting elements mounted on the body, and wherein the second light-emitting element comprises a second plurality of light-emitting elements mounted on the body. In addition, the method may be used wherein the body comprises a first body, and the device further comprises a second body flexibly connected to the first body, wherein the second body further comprises straps, a sleeve, fabric, elastic, or other means or devices to secure the second body to a user's leg, wherein attaching the wearable light-up device to the user's leg or foot comprises using the straps to secure the second body to the user's leg.

There has thus been outlined, rather broadly, some of the embodiments of the step triggered light up footwear in order that the detailed description thereof may be better understood, and in order that the present contribution to the art may be better appreciated. There are additional embodiments of the step triggered light up footwear that will be described hereinafter and that will form the subject matter of the claims appended hereto. In this respect, before explaining at least one embodiment of the step triggered light up footwear in detail, it is to be understood that the step triggered light up footwear is not limited in its application to the details of construction or to the arrangements of the components set forth in the following description or illustrated in the drawings. The step triggered light up footwear is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1:
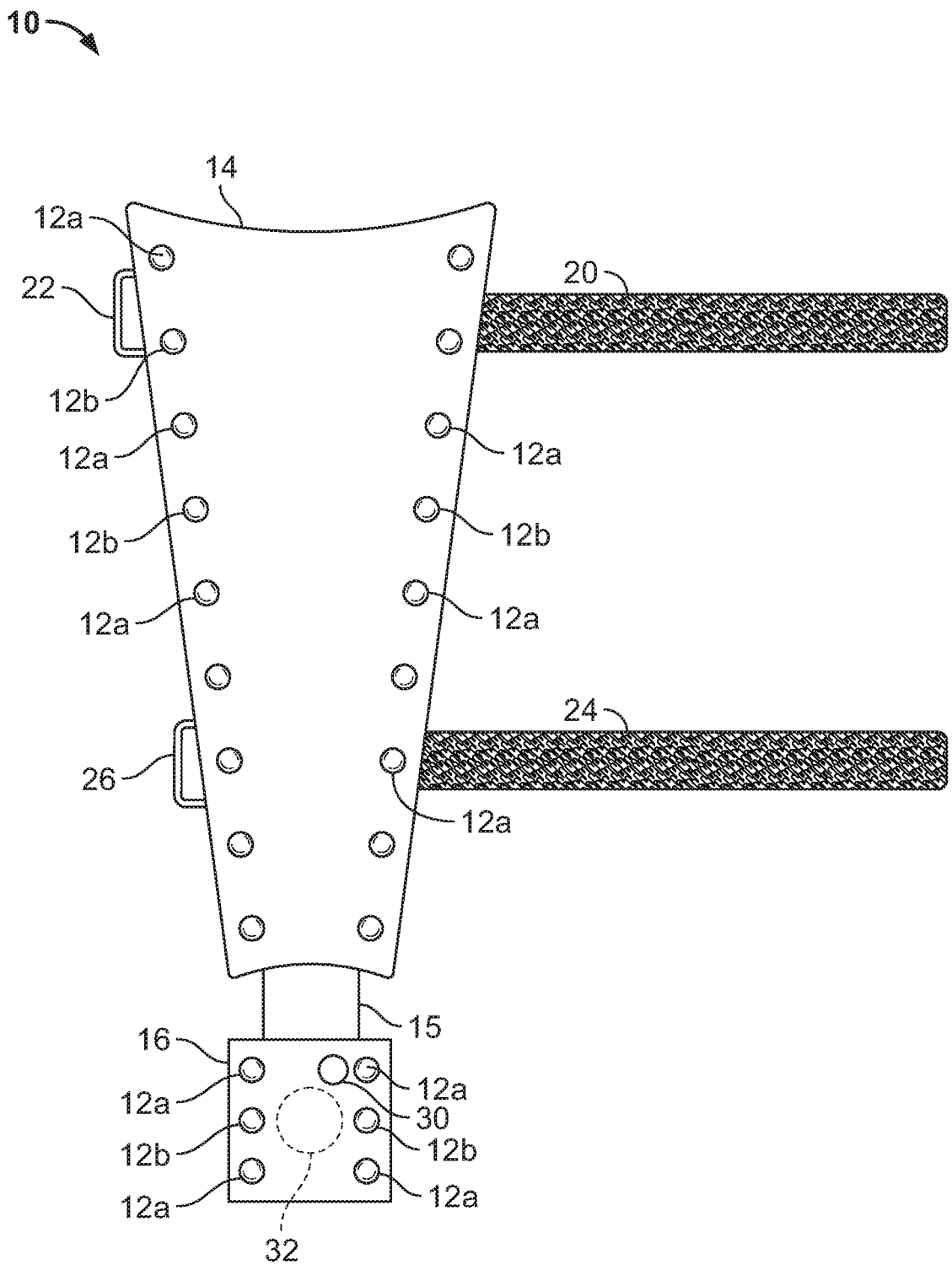
FIG. 1 is a front view of a step triggered light up footwear device in accordance with an example embodiment.

An example embodiment is directed to a Step-Triggered Light Up Footwear device 10. The device 10 is generally a wearable light-up device that includes a body 16 with a battery holder 33, a manual switch 30, and a motion sensor 34. The body 16 may be a rigid or flexible body that rests on top of a user's foot. It may also be flexible or soft, and may be made of plastic or other suitable materials. The device may include a battery 32 positioned in the battery holder 33, a first light-emitting element 12a, a second light-emitting element 12b, and a control circuit 40 connected to and powered by the battery 32. The control circuit 40 is also connected to the first light-emitting element 12a via output 46 and the second light-emitting element 12b via output 48, and may be further connected to receive inputs at an interface 42 from the manual switch 30 and the motion sensor 34, and from a remote device, such as a wireless phone, via antenna 35, such that operation of the manual switch 34 or a remote command causes the control circuit 40 to provide power to light the first light-emitting element 12a for a first time period, and such that a motion sensed by the motion sensor 34 causes the control circuit 40 to provide power to light the second light-emitting element 12b for a second time period. In addition to a static on/off state, the control circuit 40 may cause any or all of lights 12a, 12b, or both, to be powered on in a pattern, such as a combination of flashes or on/off conditions.

As just one possible example, the lights 12a, 12b may be lit so that motion up or down the series of lights is simulated, by turning adjacent lights on and off in rapid succession, as is familiar with signs where one or more "on" lights are activated from left to right or right to left and then turned off as the next adjacent light is activated. Further, lighting patterns can be programmed from a smartphone or remote device app and conveyed to control circuit 40, thus providing an educational experience which may be used and enhanced by STEM teachers and students to demonstrate or develop programming skills.

The motion sensor 34 in some example embodiments may be an impact switch, and further, the second light-emitting element 12b may light up momentarily when a user takes a step. In addition, the manual switch 30 may comprise a pushbutton switch.

In an example embodiment, the first light-emitting element 12a may be or include a first plurality of light-emitting elements 12a mounted on the body 16. In addition, the second light-emitting element 12b may be or include a second plurality of light-emitting elements 12b mounted on the body 16. Further, in some embodiments, the first time period may be longer than the second time period, so that activation of the manual switch 30 causes the first plurality of light emitting elements 12a to come on for a relatively sustained time period, while an impact, such as a step or other motion, may cause the second plurality of light-emitting elements 12b to light up for a short time period, giving a flash effect.

In some embodiments of the wearable light-up device 10 the body 16 comprises a first body, and also a second body 14 flexibly connected to the first body. The second body 14 further comprises means to secure the second body 14 to a user's leg, such as Velcro straps 20, 24, or an elastic sleeve connected to either side of second body 14 so that, combined with the body, a tube-like structure is formed, into which a user can insert his leg. The second body 14 may be rigid, and may be in the form of a plastic shin guard with a fabric, foam, or other backing material or component 17 on the inside to increase a user's comfort. The second body 14 may be connected to the first body 16 by a connecting element 15, which may be flexible fabric, and the first light-emitting element 12a may include a first plurality of light-emitting elements 12a mounted on the second body 14 and being electrically connected to the control circuit 40, and the second light-emitting element may include a second plurality of light-emitting elements 12b mounted on the second body 14, and may be electrically connected to the control circuit 40 by wiring 41.

The light-emitting element or elements 12a of the first plurality of light-emitting elements may be mounted on the first body 16 and the light-emitting element or elements 12b of the second plurality of light-emitting elements may be mounted on the first body 16. In any of the embodiments described herein, the first body 16 and the second body 14 may be flexible or rigid, and the light emitting elements 12a and 12b may be LEDs of any type, such as bi-color, multicolor, RGB, etc. The light emitting elements may also be any other type of device, such as incandescent or fluorescent, etc.

Further embodiments can include a method of using any device 10 described above. As an example, such a method may comprise attaching the wearable light-up device 10 to a user's leg or foot; using the manual switch 30 to activate the first light-emitting element 12a for the first time period; and taking a step so that the motion sensor 34 is activated such that the second light-emitting element 12b is activated for the second time period. The method may be used wherein the first light-emitting element comprises a first plurality of light-emitting elements 12a mounted on the body 16, and wherein the second light-emitting element comprises a second plurality of light-emitting elements 12b mounted on the body 16.

In addition, the method may be used wherein the body 16 comprises a first body, and the device further comprises a second body 14 flexibly connected to the first body 16, wherein the second body 14 further comprises straps (by way of non-limiting example, Velcro straps 20 and 24 that are looped through eyes 22 and 26, respectively), a sleeve, fabric, elastic, or other means or devices to secure the second body 14 to a user's leg, wherein attaching the wearable light-up device 10 to the user's leg or foot comprises using the straps to secure the second body 14 to the user's leg. When the second body 14 is secured to a user's leg, the first body 16 will typically rest atop the user's foot, held in position by connecting element 15. Connecting element 15 may be fabric or other material, may be flexible, and can include or conceal flexible or stationary wiring 41 that electrically connects the first body 16 to the second body 14.

B. First Body

The wearable light-up device 10 generally has a body 16, which may be referred to as a "first" body, especially in embodiments that include a second body. The first body 16, as well as other main elements of footwear device 10, is best shown in FIGS. 1-4. The body 16 (or alternatively, body 14) can include a battery holder 33, a manual switch 30, and a motion sensor 34. The body 16 may be a rigid body that rests on top of a user's foot as shown in FIG. 3. It may also be flexible or soft. The device 10 may include a replaceable battery 32 positioned in the battery holder 33, and the battery may be a conventional battery, such as a button cell or AAA or AA type. As shown in FIG. 2, if the battery 32 is a coin-type, the holder 33 may include a screw-on cap. The battery 32 may also be rechargeable, having any of a number of form factors. The first body 16 may also have a first light-emitting element 12a, a second light-emitting element 12b, and a control circuit 40 connected to and powered by the battery 32 via wiring 41. As shown in FIG. 3, the first body 16 may rest on the top of a user's foot, and may further contain the electrical and electronic components used for the functioning of the device (e.g., step-activation of one or more lights). The body 16 may be rigid, flexible, one-piece, or multi-piece. As also shown generally in the figures, body 16 may include lights 12a and 12b (which may be multiple lights activated in sets or patterns) attached or affixed to the body 16 in any pattern, such that the lights are visible, especially at night.

Figure 4:
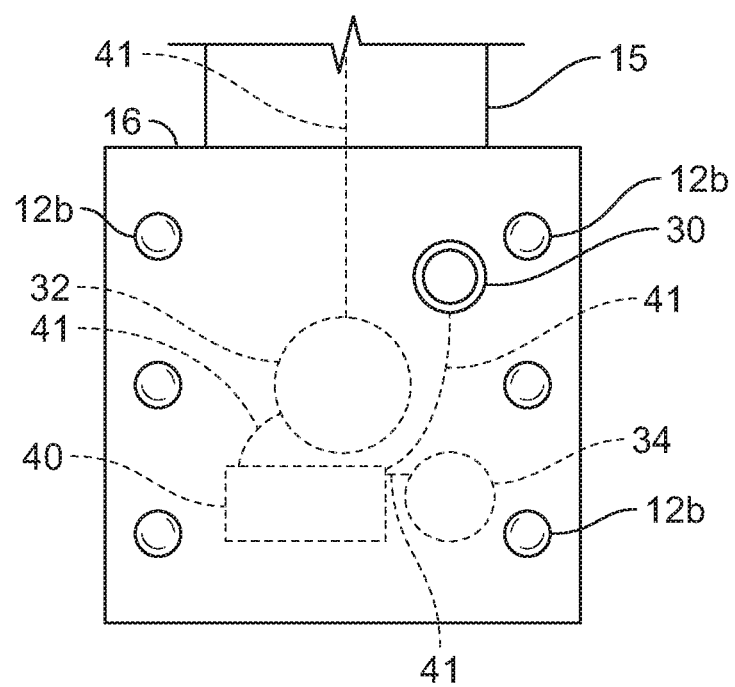
FIG. 4 is a detail view of a body portion of step triggered light up footwear device in accordance with an example embodiment.

As also shown in the figures, especially FIG. 4, the body 16 can provide support and connections for various components of the device 10, such as control circuit 40, manual switch 30, wiring 41, and manual switch 30 and motion sensor 34, which may be an impact switch. All of the electrical components of the system may be conductively coupled together by wiring 41, as represented by FIG. 4. Any or all of these components may also be mounted or positioned elsewhere, such as on second body 14. As will be discussed further below, in an example embodiment, motion sensor 34 may be an impact switch, which can be triggered when a user takes a step on the ground.

C. Second Body

Figure 2:
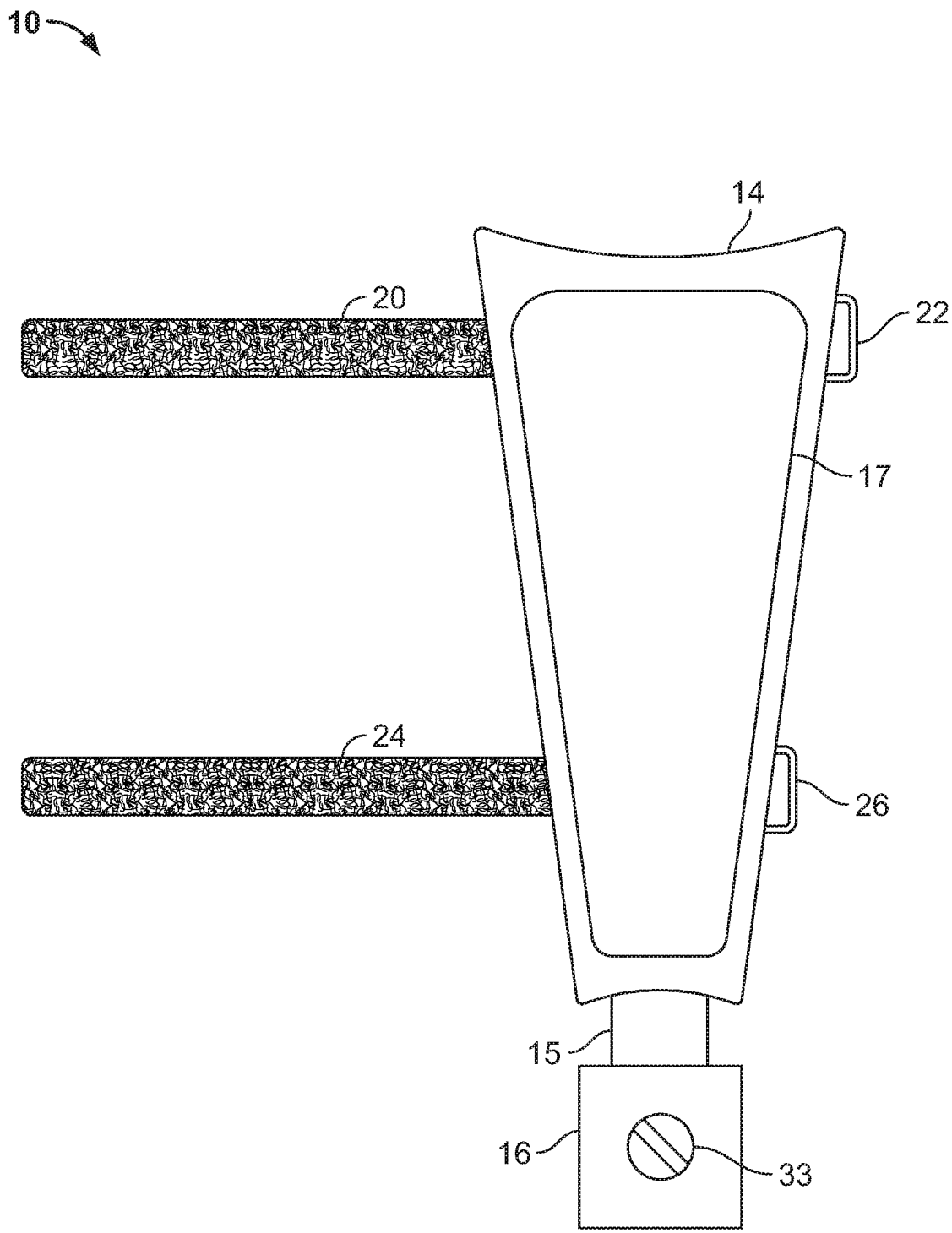
FIG. 2 is a rear view of a step triggered light up footwear device in accordance with an example embodiment.
Figure 3:
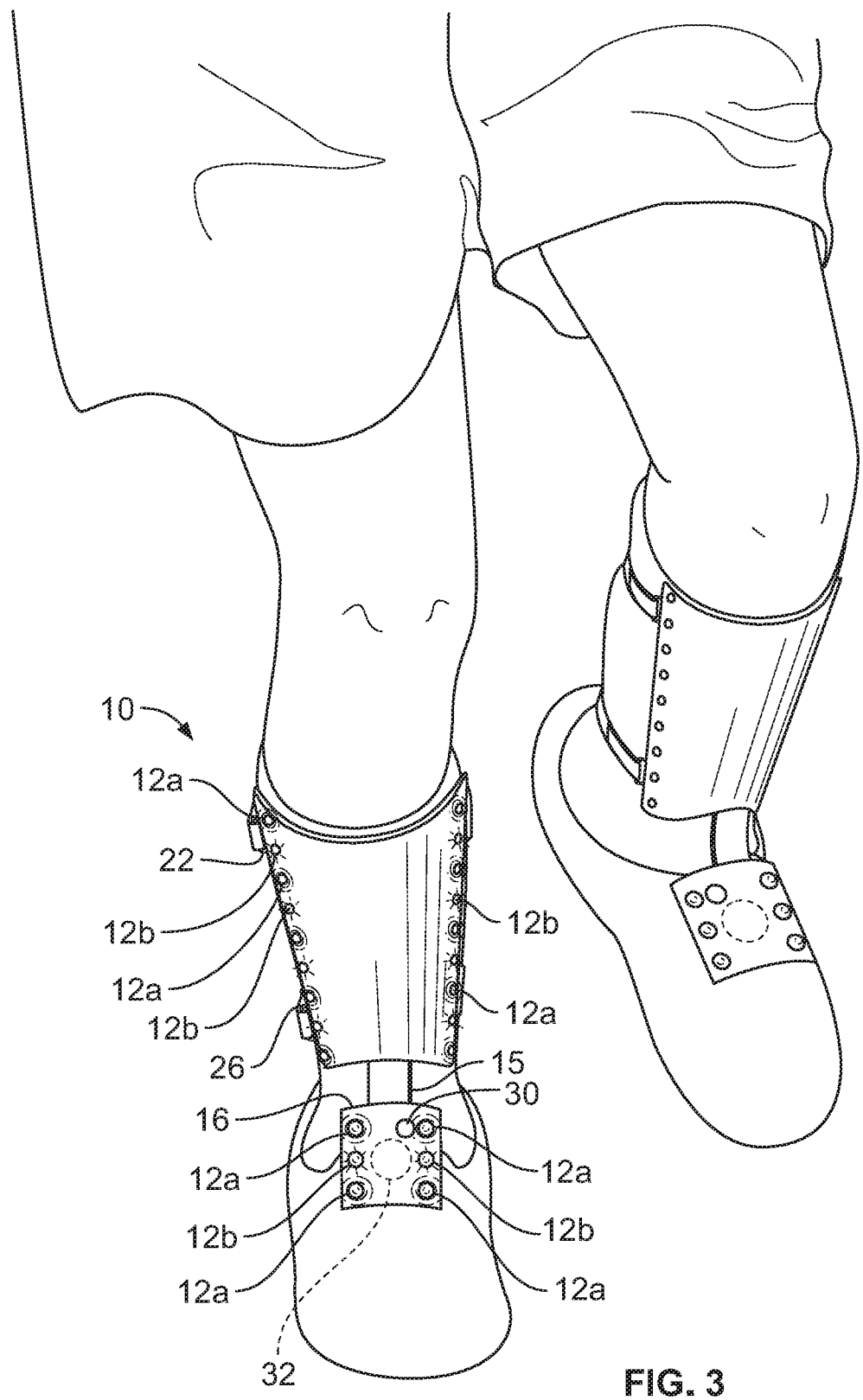
FIG. 3 is a perspective view of a step triggered light up footwear device in use, in accordance with an example embodiment.

The wearable light-up device 10 may also include a body 14, which may be referred to as a "second" body, as shown for example in FIGS. 1-3.

The second body 14 may also have a first light-emitting element 12a, a second light-emitting element 12b, which are operatively connected to the control circuit 40 via wiring 41, which may be within or adjacent to element 15 which typically flexibly connects the second body 14 to the first body 16.

As shown in FIG. 3, the second body 14 may include straps 20 and 24, which may be Velcro straps, to attached or secure the second body 14 (which, as shown, may be in the form of a shin guard) to the lower leg of a user. As also shown, the straps may be used with eyes 22 and 26 to secure body 14. Other means or devices may also be used to secure the body 14 on a user's leg, such as an elastic sleeve or straps, fasteners, etc. For example, an elastic sleeve may be used, such that the upper portion of device 10 can be slipped on like a sock.

The body 14, as with body 16, may be rigid, flexible, one-piece, or multi-piece. As also shown generally in the figures, body 14 may include lights 12a and 12b (which may be multiple lights activated in sets or patterns) attached or affixed to the body 14 in any pattern, such that the lights are visible to others. As shown in FIGS. 1 and 3, the lights 12a and 12b are affixed to second body 14 in an alternating pattern, although other patterns are also possible.

D. Control Circuit

The control circuit 40 may be positioned in or built into the first body 16, as shown in FIG. 4, or alternatively, in second body 14. Control circuit 40 is represented schematically and functionally in FIGS. 5 and 6. As shown therein, the control circuit 40 is adapted to receive, such as via interface 42, inputs from manual switch or "power switch" 30, from motion sensor 34, which may be an impact switch or other type of motion sensor, and to further receive inputs via antenna 35, in the form of commands from a remote device, such as a smart phone and an application on the phone designed to interact with and control wearable light-up device 10. As best shown in FIG. 4, the various electronic components may be conductively coupled by wiring 41, which serves to ultimately provide power to the lights 12a and 12b under particular conditions as described herein.

Operation of the manual switch 34 or a remote command received at antenna 35 causes or may cause the control circuit 40 to provide power via output 46 to light the first light-emitting element or elements 12a for a first time period, and such that a motion sensed by the motion sensor 34 causes the control circuit 40 to provide power to light the second light-emitting element 12b for a second time period. In addition to a static on/off state, the control circuit 40 may cause any or all of lights 12a, 12b, or both, to be powered on in one or more patterns, such as a combination of flashes or on/off conditions. In addition to manual switch 34, the device 10 may be activated by an app from a smartphone via a command or commands received at interface 42 using antenna 35.

The control circuit 40 may also include a timer/output portion or section 44, which provides outputs such as output 46 to light-emitting elements 12a, and output 48, which similarly provides power to light-emitting elements 12b. Elements 12a and 12b, as mentioned briefly above, may be or include single color LEDs, bi-color LEDs, tri-color or multi-color LEDs, etc. As is known, such LEDs can be driven to produce different discrete colors or blends of colors, and thus the colors may be controlled by timer/output circuit 44. In addition to LEDs, other types of lighting elements may also be used.

E. Operation of Preferred Embodiment

Although it may be used for any application, one possible use for the wearable light-up device 10 is for a child's game of imagination, wherein the game players imagine that the floor of a room or area is hot lava. To enhance the game, in example embodiments, the players may all be wearing "lava boots," which are the light-up, step-triggered devices 10 described herein. To play, the users would first put on the footwear using straps 20, 24, and corresponding eyes 22 and 26 on the opposite side of second body 14, as shown in FIGS. 1-3.

Figure 5:
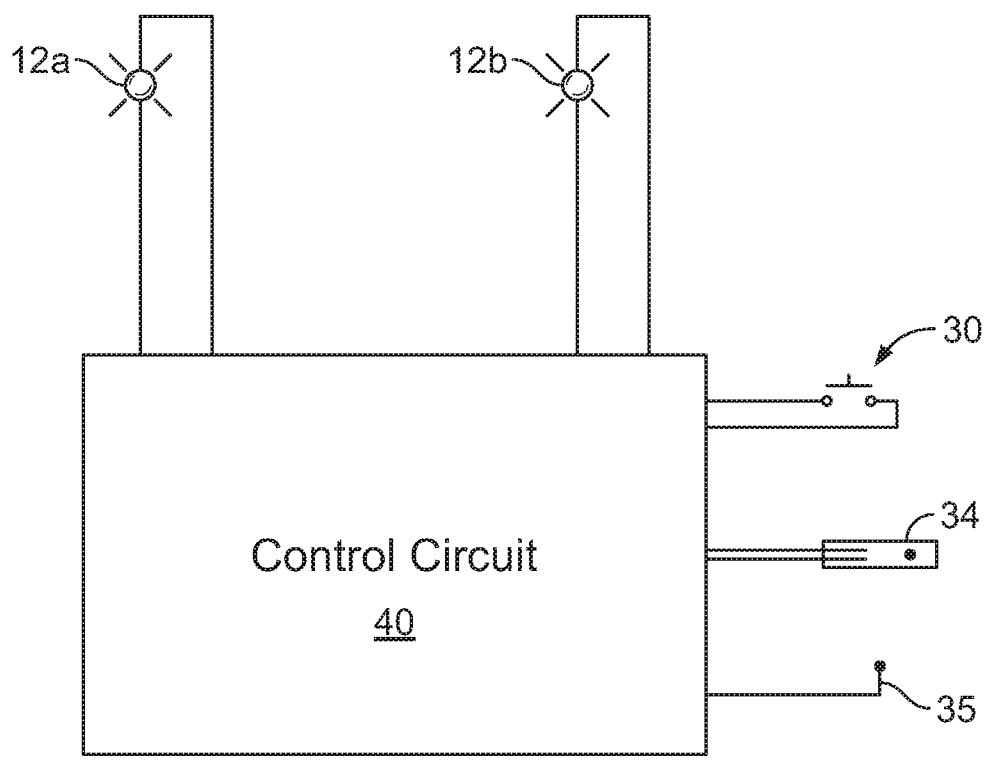
FIG. 5 is a functional diagram of a step triggered light up footwear device in accordance with an example embodiment.
Figure 6:
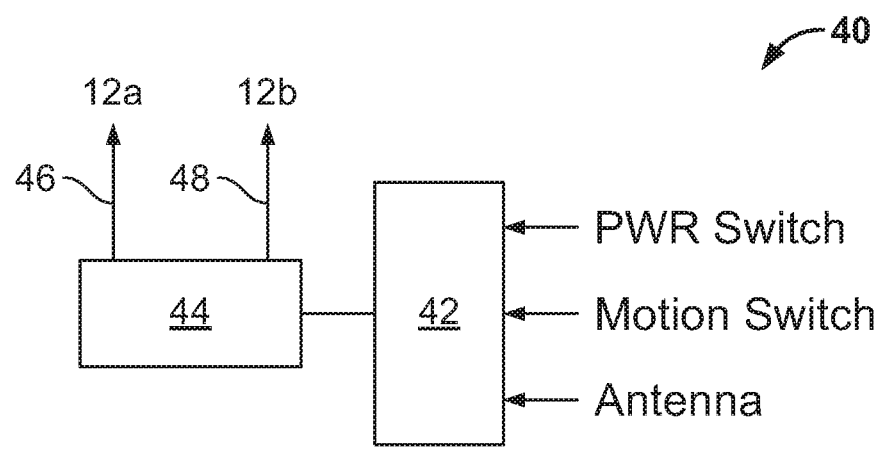
FIG. 6 is another functional diagram of a step triggered light up footwear device in accordance with an example embodiment.
Figure 7:
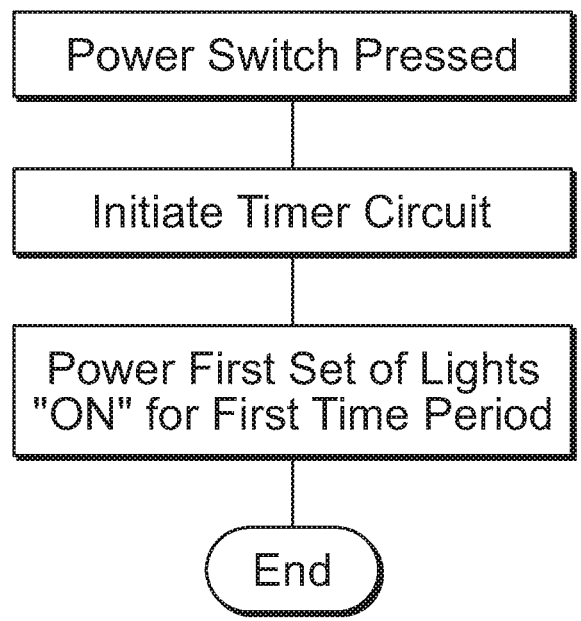
FIG. 7 is a flow chart illustrating an example of operation of a step triggered light up footwear device in accordance with an example embodiment.

When putting the footwear on, users may position the first, or lower, body 16 to rest on top of the foot, and over the shoes (if worn). It is this general orientation in which a motion sensor or impact switch 34 is designed to operate, so that a step triggers the sensitive switch or sensor. At the start of play or use, the user would press the manual switch 30, which may be a momentary action pushbutton switch as represented in FIG. 5. This step, as well as those that follow, are generally shown in FIGS. 7-10.

When the power switch 30 is pressed, the signal or voltage is received at an input of interface 42 of control circuit 40. The signal triggers a timer in timer/output circuit 44 to start, which in turn causes light-emitting elements 12*a* to illuminate for a fixed period of time, indicating that the device 10 is "on" and ready for use. Light elements 12*a* are provided with output 46 from timer/output circuit 44, which can be a portion or section of circuit 40. This condition is shown generally in FIG. 3, with all the elements 12*a* shown as being steadily on in one of the devices being worn by a child (e.g., on the right leg). In addition to powering light elements 12*a* on steadily for a fixed period of time, a user may send a program for a light pattern or patterns to the control circuit 40 via interface 42, and the light elements 12*a* may display that pattern when the manual switch 30 is pressed, or when the device 10 is otherwise activated, such as via smartphone app. The patterned illumination may continue under control of a timer function in control circuit 40, which is useful to preserve battery life.

The pattern may be comprised of varying on and off times, and may simulate motion by sequentially illuminating light elements next to each other. The pattern or patterns may also include using color where different color LEDs are used. For example, a pattern may be comprised of alternating LEDs between red and green on a fixed or variable repeating time basis.

Figure 8:
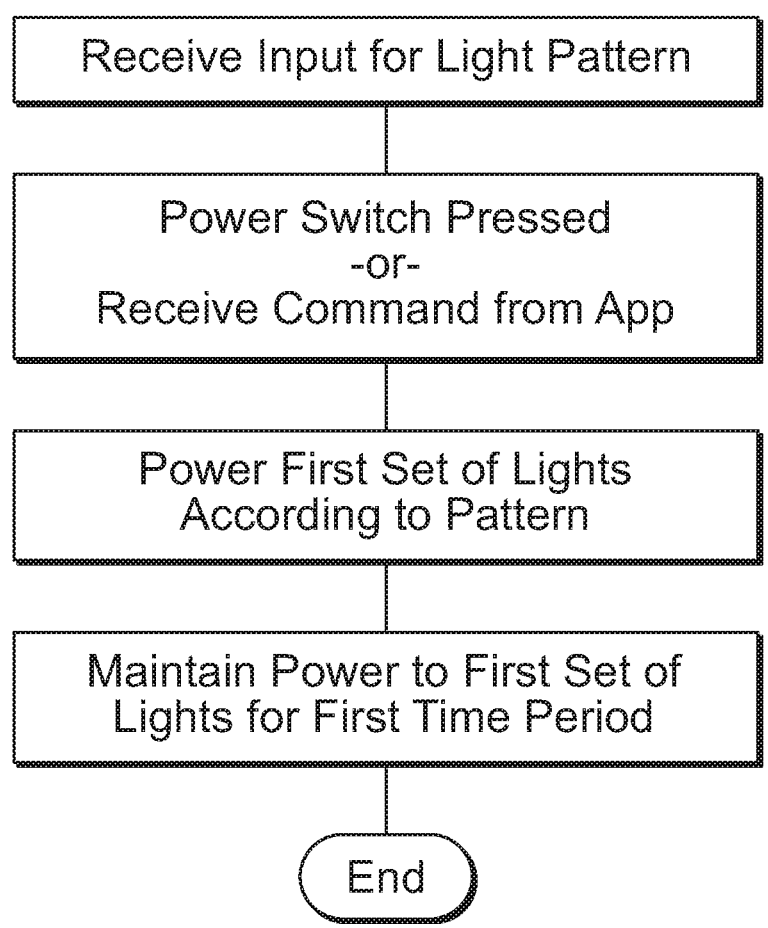
FIG. 8 is another flow chart illustrating an example of operation of a step triggered light up footwear device in accordance with an example embodiment.
Figure 9:
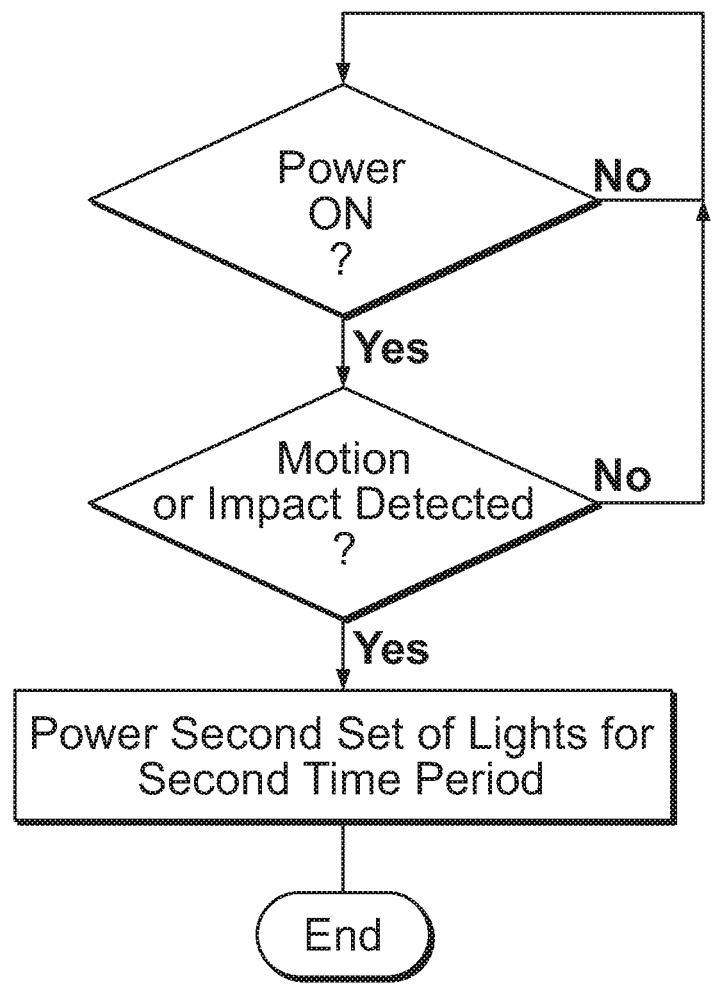
FIG. 9 is another flow chart of a step triggered light up footwear device in accordance with an example embodiment.
Figure 10:
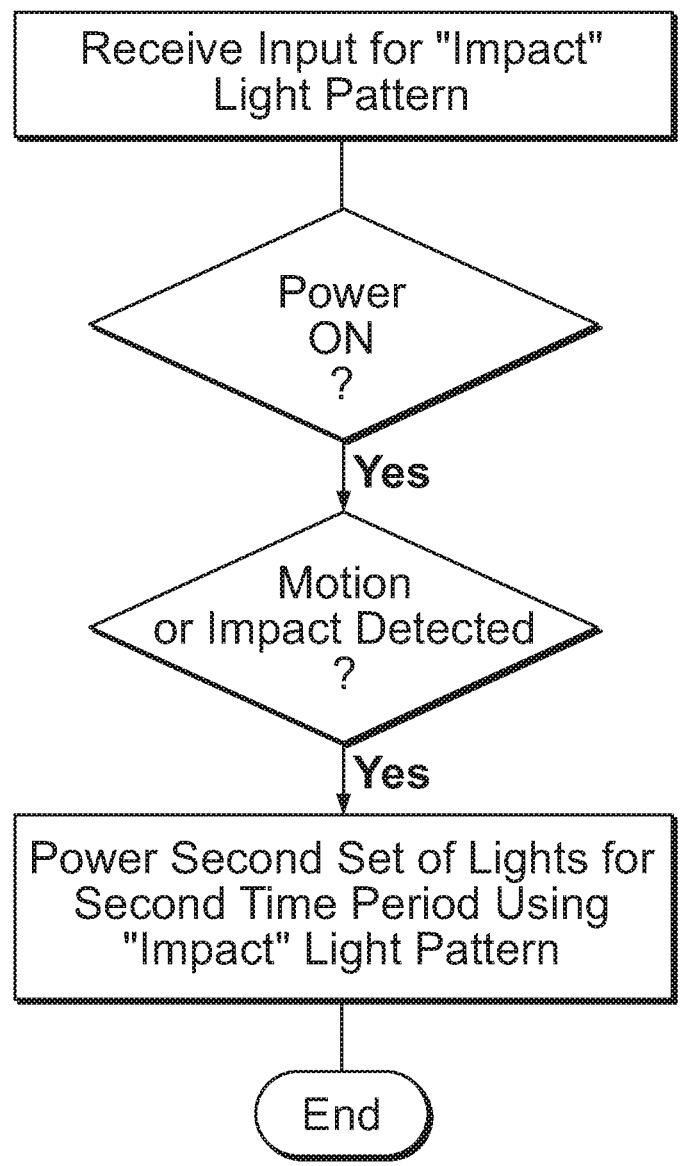
FIG. 10 is another flow chart of a step triggered light up footwear device in accordance with an example embodiment.

Thus activated, the device 10 is ready to receive an input or inputs from motion sensor 34, which, as mentioned, may be in the form of a sensitive impact switch or other type of sensor, such as a conductive chamber with a circuit that can be closed by a moving element, such as a small metallic or conductive ball. In an example embodiment, the sensor 34 is triggered when a user steps on the floor or ground; in normal play, the user may try to avoid "accidentally" touching the floor by moving on furniture in a room, for example. When the control circuit 40 receives a signal from sensor 34, it triggers a separate timer in timer/output circuit 44, which provides a power signal to output 48 from timer/output circuit 44. The time delay for light-emitting elements 12*b* may be shorter than that for elements 12*a*, so that, when triggered, the elements 12*b* provide a noticeable, momentary flash or other pattern indicating that the user has stepped on the floor or otherwise triggered the lights. As shown in FIGS. 8 and 10, the normal "on" light pattern, and the "impact" pattern, which is indicative of a user triggering the impact or motion sensor, can be changed, for example, by sending a pattern command to the control circuit 40 using a smartphone app associated with the devices 10, and designed for the purpose. Such patterns may be fixed or may even be created by children, and designing different light patterns and durations may be used for educational purposes, such as for STEM classes.

In addition to use for game play, the motion sensor 34 can also simply be used to trigger light-emitting elements 12*b* whenever a user walks, runs, or jumps, in conjunction with the timed function for the device being powered on. Typically, regardless of what pattern is used, the light-emitting elements 12*a* will be on steadily or in a repeating pattern for a period of time started by pressing pushbutton switch 30, and which period is dictated overall by an onboard timer in control circuit 40. However, as with the lighting patterns, the time period for light-emitting elements 12*a* can be changed under control of a user via interface 42, as described herein. Specifically, the interface 42 may be adapted to receive Wi-Fi or Bluetooth commands from a user's phone or other device. Similarly, the time period for elements 12*b* may be altered under a user's control via the same mechanisms.

Further, the motion sensor 34 may be used as an input for a pedometer, which may provide step data to control circuit 40 for later upload after a walk, or the pedometer data may be provided to a user's phone via Bluetooth and the interface 42 of control circuit 40, to actively track walking or running progress.

Unless otherwise defined, all technical and scientific terms used herein have the same meaning as commonly understood by one of ordinary skill in the art to which this invention belongs. Although methods and materials similar to or equivalent to those described herein can be used in the practice or testing of the step triggered light up footwear, suitable methods and materials are described above. All publications, patent applications, patents, and other references mentioned herein are incorporated by reference in their entirety to the extent allowed by applicable law and regulations. The step triggered light up footwear may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A wearable light-up device, comprising:
   a body comprising a battery holder, a manual switch, and a motion sensor, wherein the body comprises a first body;
   a second body flexibly connected to the first body, wherein the second body further comprises a means to secure the second body to a leg of a user;
   a battery positioned in the battery holder;
   a first light-emitting element;
   a second light-emitting element; and
   a control circuit connected to and powered by the battery, the control circuit also connected to the first light-emitting element and the second light-emitting element, and further connected to receive inputs from the manual switch and the motion sensor, such that operation of the manual switch causes the control circuit to provide power to light the first light-emitting element for a first time period, and such that a motion sensed by the motion sensor causes the control circuit to provide power to light the second light-emitting element for a second time period.

2. The wearable light-up device of claim 1, wherein the motion sensor comprises an impact switch, wherein the second light-emitting element lights up momentarily when a user takes a step.

3. The wearable light-up device of claim 1, wherein the manual switch comprises a pushbutton switch.

4. The wearable light-up device of claim 1, wherein the first light-emitting element comprises a first plurality of light-emitting elements mounted on the body.

5. The wearable light-up device of claim 1, wherein the second light-emitting element comprises a second plurality of light-emitting elements mounted on the body.

6. The wearable light-up device of claim 1, wherein the first light-emitting element comprises a first plurality of light-emitting elements mounted on the body and wherein the second light-emitting element comprises a second plurality of light-emitting elements mounted on the body.

7. The wearable light-up device of claim 1, wherein the first time period is longer than the second time period.

8. The wearable light-up device of claim 1, wherein the second body is connected to the first body by a flexible fabric, and wherein the first light-emitting element comprises a first plurality of light-emitting elements mounted on the second body and being electrically connected to the control circuit, and wherein the second light-emitting element comprises a second plurality of light-emitting elements mounted on the second body and being electrically connected to the control circuit.

9. The wearable light-up device of claim 8, wherein at least one light-emitting element of the first plurality of light-emitting elements is mounted on the first body and wherein at least one light-emitting element of the second plurality of light-emitting elements is mounted on the first body.

10. A method of using the wearable light-up device of claim 1, comprising:
attaching the wearable light-up device to a user's leg or foot;
using the manual switch to activate the first light-emitting element for the first time period; and
taking a step so that the motion sensor is activated such that the second light-emitting element is activated for the second time period.

11. The method of claim 10, wherein the first light-emitting element comprises a first plurality of light-emitting elements mounted on the body.

12. The method of claim 11, wherein the second light-emitting element comprises a second plurality of light-emitting elements mounted on the body.

13. The method of claim 10, wherein the second body further comprises straps to secure the second body to the leg of the user, wherein attaching the wearable light-up device to the leg of the user comprises using the straps to secure the second body to the leg of the user.

14. The method of claim 13, wherein the second body is connected to the first body by a flexible fabric, and wherein the first light-emitting element comprises a first plurality of light-emitting elements mounted on the second body and electrically connected to the control circuit, and wherein the second light-emitting element comprises a second plurality of light-emitting elements mounted on the second body and electrically connected to the control circuit.

15. The wearable light-up device of claim 1, wherein the control circuit further comprises an interface usable to wirelessly receive commands by which a user can manually control the first light-emitting element or the second light-emitting element.

16. The wearable light-up device of claim 1, wherein the first light-emitting element comprises a multicolor LED and wherein the second light-emitting element comprises a multicolor LED.

17. A wearable light-up device, comprising:
a first body comprising a battery holder, a pushbutton switch, and a motion sensor;
a battery positioned in the battery holder;
a second body flexibly connected to the first body, wherein the second body is attachable to a user's leg;
a first plurality of light-emitting elements on the first body and the second body;
a second plurality of light-emitting elements on the first body and the second body; and
a control circuit connected to and powered by the battery and further connected to receive inputs from the pushbutton switch and the motion sensor, such that operation of the pushbutton switch causes the control circuit to provide power to light the first plurality of light-emitting elements for a first time period, and such that a motion sensed by the motion sensor causes the control circuit to provide power to light the second plurality of light-emitting elements for a second time period.

18. A wearable light-up device, comprising:
a first rigid body comprising a battery holder, a pushbutton switch, and an impact switch, the first rigid body sized and shaped to rest on top of a user's foot;
a battery positioned in the battery holder;
a second rigid body flexibly connected by a fabric to the first rigid body, wherein the second rigid body comprises a plurality of Velcro straps for attachment to a leg of a user;
a first plurality of multicolor LEDs on the first rigid body and on the second rigid body;
a second plurality of multicolor LEDs on the first rigid body and on the second rigid body; and
a control circuit connected to and powered by the battery, the control circuit connected to the first plurality of multicolor LEDs and the second plurality of multicolor LEDs, and further connected to receive inputs from the pushbutton switch and the impact switch, the control circuit further comprising an interface usable to wirelessly receive commands by which the user can manually or automatically control the first plurality of multicolor LEDs or the second plurality of multicolor LEDs;
wherein operation of the pushbutton switch or a command received via the interface activates a timer in the control circuit to provide power to light the first plurality of multicolor LEDs for a first time period;
wherein an impact sensed by the impact switch activates a timer in the control circuit to provide power to light the second plurality of multicolor LEDs for a second time period, the second time period being shorter than the first time period; and
wherein the second plurality of multicolor LEDs light up momentarily when the user takes a step.

19. A wearable light-up device, comprising:
a body comprising a battery holder, a manual switch, and a motion sensor, wherein the body comprises a first body;
a second body flexibly connected to the first body by a flexible fabric;

a battery positioned in the battery holder;
a first light-emitting element;
a second light-emitting element; and
a control circuit connected to and powered by the battery, the control circuit also connected to the first light-emitting element and the second light-emitting element, and further connected to receive inputs from the manual switch and the motion sensor, such that operation of the manual switch causes the control circuit to provide power to light the first light-emitting element for a first time period, and such that a motion sensed by the motion sensor causes the control circuit to provide power to light the second light-emitting element for a second time period.

20. A method of using a wearable light-up device having a body comprising a battery holder, a manual switch, and a motion sensor, wherein the body comprises a first body, a second body flexibly connected to the first body, a plurality of straps connected to the second body adapted to secure the second body to a leg of a user, a battery positioned in the battery holder, a first light-emitting element, a second light-emitting element, and a control circuit connected to and powered by the battery, the control circuit also connected to the first light-emitting element and the second light-emitting element, and further connected to receive inputs from the manual switch and the motion sensor, such that operation of the manual switch causes the control circuit to provide power to light the first light-emitting element for a first time period, and such that a motion sensed by the motion sensor causes the control circuit to provide power to light the second light-emitting element for a second time period, the method comprising:
  attaching the wearable light-up device to a user's leg or foot;
  using the manual switch to activate the first light-emitting element for the first time period; and
  taking a step so that the motion sensor is activated such that the second light-emitting element is activated for the second time period.

* * * * *